United States Patent [19]

Ignoffo

[11] 4,032,310
[45] June 28, 1977

[54] MUFFLER AND EXHAUST GAS PURIFIER FOR INTERNAL COMBUSTION ENGINES

[76] Inventor: Vincent E. Ignoffo, 7040 W. Newport, Chicago, Ill. 60631

[22] Filed: Nov. 3, 1975

[21] Appl. No.: 627,963

Related U.S. Application Data

[63] Continuation of Ser. No. 470,180, May 15, 1974, abandoned.

[52] U.S. Cl. .................... 55/276; 55/316; 55/319; 55/502; 55/503; 55/504; 55/515; 55/518; 55/DIG. 21; 55/DIG. 30; 23/288 F; 23/288 FB; 181/36 C; 181/47 R; 181/50; 181/57; 60/302; 60/311
[51] Int. Cl.² .................................. B01D 50/00
[58] Field of Search ............ 55/276, 316, 319, 323, 55/327, 410, 485, 486, 488, 489, 498, 502, 503, 505, 509, 512, 515, 518, DIG. 21, DIG. 30, 501, 504; 23/288 F, 288 FB; 60/297, 299, 311, 302; 181/35 A, 36 B, 36 C, 36 D, 47 R, 50, 57, 59

[56] References Cited

UNITED STATES PATENTS

| | | | |
|---|---|---|---|
| 984,890 | 2/1911 | Dudderar | 181/47 R |
| 1,595,711 | 8/1926 | Cornelier | 60/299 |
| 2,553,763 | 5/1951 | Hammon | 55/518 |
| 2,702,089 | 2/1955 | Engelder | 55/515 |
| 2,732,026 | 1/1956 | Folts | 55/DIG. 30 |
| 3,045,422 | 7/1966 | Houdry | 23/288 F |
| 3,247,665 | 4/1966 | Behrens | 55/DIG. 30 |
| 3,276,202 | 10/1966 | Gary | 23/288 F |
| 3,522,863 | 8/1970 | Ignoffo | 181/59 |
| 3,692,497 | 9/1972 | Keith et al. | 60/299 |
| 3,757,892 | 9/1973 | Raudman, Jr. | 55/276 |
| 3,884,655 | 5/1975 | Coop | 55/276 |

*Primary Examiner*—Frank W. Lutter
*Assistant Examiner*—David L. Lacey
*Attorney, Agent, or Firm*—Keil, Thompson & Shurtleff

[57] ABSTRACT

Internal combustion engine exhaust gas muffler and purifier with segmented hollow shell and removable middle segment, said shell having an upstream exhaust gas expansion chamber, a downstream sound-absorbing and sound-collecting chamber, and a middle, removable cartridge receiving housing, the cartridge being filled with small particles of exhaust gas purifying material.

2 Claims, 9 Drawing Figures

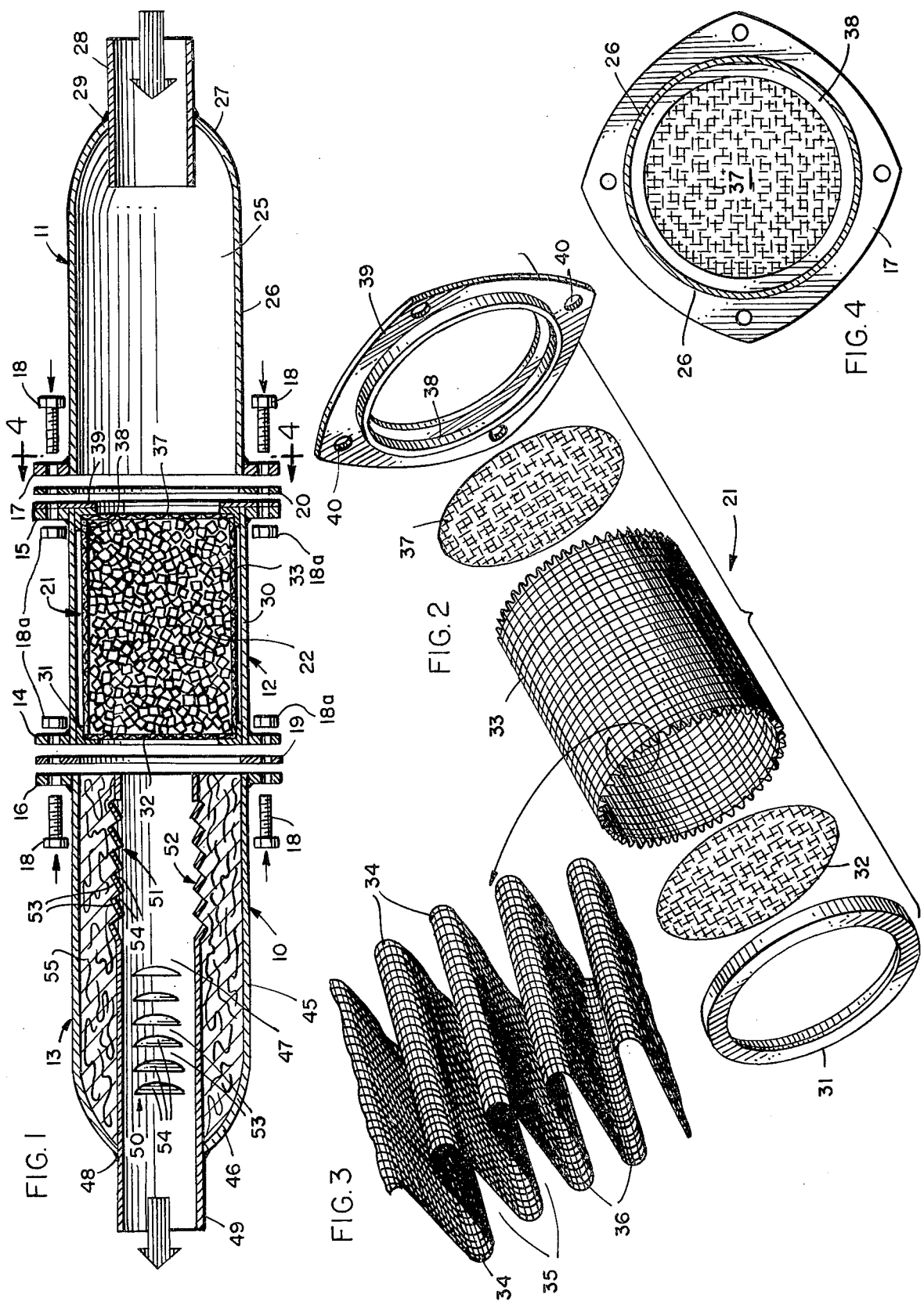

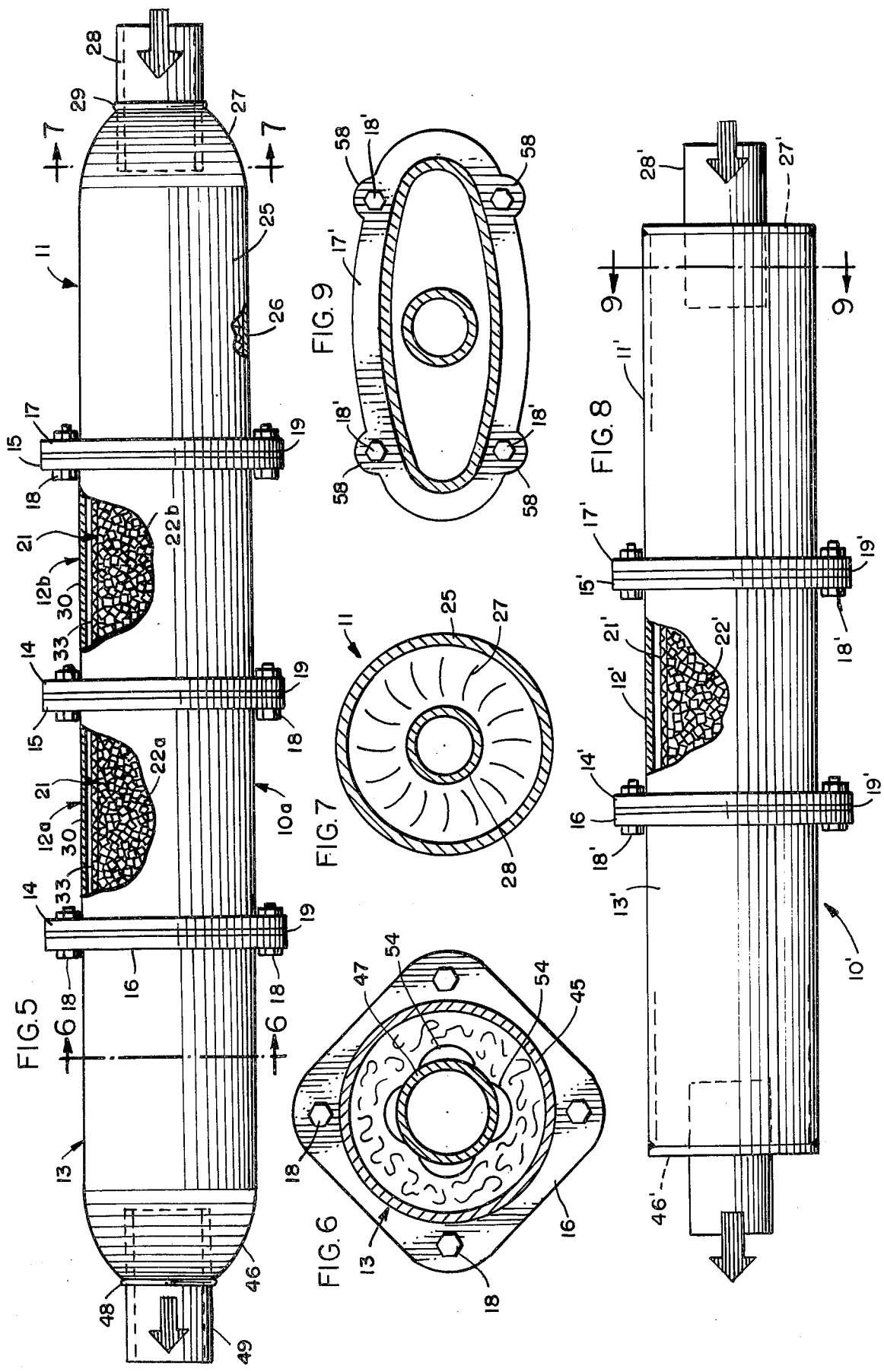

MUFFLER AND EXHAUST GAS PURIFIER FOR INTERNAL COMBUSTION ENGINES

This application is a continuation of my application Ser. No. 470,180, filed May 15, 1974, now abandoned.

INTRODUCTION

The subject invention concerns units for exhaust systems of automobiles and provides a combination of exhaust gas sound-reducing or modifying means with a replaceable cartridge means for purifying by absorption and/or chemical modification of the atmosphere-polluting components of exhaust gases of internal combustion engines. The private passenger automobile and trucks constitute a major, if not the major, factor in atmospheric pollution. The exhaust gases thereof introduce into the atmosphere not only carbon monoxide but also a large number of other pollutants which adversely affect human life and plant life. Among these other pollutants may be listed nitrogen oxide gases, unburned or partially burned hydrocarbon vapors, both aromatic and aliphatic, sulfur dioxide and sulfur trioxide, and lead compounds. The major components of burned gasoline, diesel fuel and the like are carbon dioxide and water, neither of which is harmful to human or plant life.

THE INVENTION

This invention provides an exhaust gas muffler and purifier in use of exhaust systems of internal combustion engines. The gas purifier is a body of small particles of exhaust gas purifying material having absorbant and/or chemical modifying properties. Exemplary of such materials are particles of charcoal and/or catalytic materials such as vanadium catalysts which convert the components of the heated exhaust gases to less noxious compositions. In the subject invention, the body of these particles coacts with a downstream, sound-absorbing and sound-collecting means to provide not only exhaust gas purification but also a low level exhaust sound.

Briefly, the invention is an exhaust gas unit comprising a hollow shell adapted for flow of exhaust gases therethrough. This hollow shell is segmented into three parts: a hollow, exhaust gas-expansion chamber in the upstream portion of the unit, a sound-absorbing and sound-collecting chamber in the downstream portion and an intermediate chamber or housing containing a body of small particles of exhaust gas purifying material, preferably in a removable and replaceable cartridge. The shell is longitudinally segmented at at least one and preferably at both ends of the intermediate part and is held in place by releasable fastening means securing its end or ends to a contiguous end of the respective upstream or downstream chamber. With the shell segmented at both ends of the intermediate part, it may be removed from the exhaust system of an automobile or truck for inspection or replacement of the cartridge without disconnecting either end of the unit from its respective exhaust pipes.

The cartridge has foraminous end walls and also preferably has a foraminous cylindrical wall, e.g., screens made from wires of heat-resistant materials, e.g., monel metal, nickel-chrome, etc. The cylindrical screen wall preferably is longitudinally corrugated to provide longitudinally extending, gas-conveying passages between the corrugations. One end of the cartridge, preferably its upstream end, may have incorporated thereon a gasket adapted to seat and seal the joint between opposed flanges on the contiguous ends of the cartridge-housing, intermediate part of the shell and the contiguous upstream or downstream part of the shell.

The exhaust gases flow into the upstream expansion chamber and therein are allowed to expand and decrease their linear velocity as a result of the larger transverse cross section of the expansion chamber relative to the cross section of the exhaust gas-entrant pipe or tube. They then flow through the intermediate part of the shell in intimate contact with the particles in the cartridge and exit therefrom into the downstream, sound-absorbing and sound-collecting chamber.

The latter chamber has an open upstream end and a tubular core extending axially therethrough. The tubular core has a plurality of openings through which a part of the exhaust gas stream which enters the annular space between the tubular core and the downstream shell portion can flow from the annular space into the tubular core and unite with the other part of the gas stream which flows directly into and through the tubular core. The annular space preferably is filled with a heat-resistant, sound-absorbing, gas pervious material, e.g., a packing of heat-resistant fibers such as glass fibers or asbestos fibers.

The tubular core preferably has a louver construction of the type disclosed for the tubular core of my muffler disclosed in my U.S. Pat. No. 3,522,863, issued Aug. 4, 1970. This core uses openings in the form of a plurality of louvers in the tubular wall of the core, which louvers extend transversely of the longitudinal axis of the core and are formed integrally therein. However, for purposes of the best sound-collection qualities with the exhaust gas unit of the subject invention, these louvers slope inwardly toward the middle of the tubular core in a direction toward the downstream end of the unit instead of sloping toward the upstream end of the unit, the latter being the case in the muffler of my aforesaid patent.

DESCRIPTION OF THE DRAWINGS

A preferred embodiment of the invention is illustrated in the drawings, wherein:

FIG. 1 is an exploded, diametric cross section view of the exhaust gas muffler and purifier;

FIG. 2 is an exploded, perspective view of the removable cartridge of the embodiment of FIG. 1;

FIG. 3 is a fragmentary, enlarged, perspective view of the cylindrical screen wall of the cartridge encircled in FIG. 2;

FIG. 4 is a section view taken on section plane 4—4 of FIG. 1;

FIG. 5 is a side elevation, partly broken away, of another embodiment with two cartridge sections;

FIG. 6 is a section view taken on section plane 6—6 of FIG. 5;

FIG. 7 is a section view taken on section plane 7—7 of FIG. 5;

FIG. 8 is a side elevation of a third embodiment of the invention; and

FIG. 9 is a section view taken on section plane 9—9 of FIG. 8.

DESCRIPTION OF THE PREFERRED EMBODIMENT

The embodiment of FIGS. 1–4 is an exhaust gas muffler and purifier unit 10 segmented into three axially separable components, i.e., an upstream, gas-entrant, hollow expansion chamber 11, an intermediate, cartridge-pack chamber or housing 12, and a downstream gas-discharge, sound-absorbing and sound-muffling chamber 13. The contiguous axial ends of these components respectively have annular flanges 14–17 and are held together with the flanges in facing relationship by bolts 18 and nuts 18a. Substantially gas-tight ring gaskets 19 and 20 preferably are seated between the opposed faces of said flanges.

The intermediate chamber or housing 12 receives and is substantially filled by a removable cartridge 21 filled with heat stable particles of a substance or substances which absorb and/or chemically modify the components of the exhaust gas, particularly one or more of the above-described noxious components.

The upstream expansion chamber is principally an empty, hollow chamber 25 defined by the cylindrical shell segment 26. It has an upstream, domed end 27 which has an apexial opening into which projects an upstream connector tube 28 rigidly mounted in the opening by spotwelds or a continuous bead weld 29. The projecting end of the connector tube 28 is connected to an exhaust pipe of an automotive exhaust system.

The removable cartridge 21 (FIGS. 1–3) has at least foraminous, gas-permeable axial end walls or caps and preferably also has similarly foraminous side walls. In the illustrated embodiment, the cartridge comprises a flanged, end ring 31 in which is firmly seated the screen disc 32 which provides the foraminous end wall or cap at the downstream end of the cartridge. The cartridge further has a cylindrical wall 33 which may be solid or foraminous, but preferably is also a screen material folded into longitudinally extended corrugations 34 as particularly illustrated in FIG. 3. These corrugations provide longitudinally extending, void or substantially void, internal passages 35 and external passages 36 for flow of exhaust gases into and out of the cartridge adjacent the external cylindrical shell 30 of the intermediate chamber or housing 12. This arrangement allows some of the heat of the exhaust gases to be dissipated into and through the cylindrical wall 30.

The upstream end of the cartridge 21 has a particle-retaining, upstream screen disc 37 securely or loosely seated in the upstream ring flange 38 of the cartridge. The latter in turn preferably has secured to its upstream face or integrally formed with the upstream face a gasket 39 bearing bolt passage holes 40 through which the bolts 18 may pass. The gasket 39 in some cases may eliminate the need for gasket 20, i.e., where the gasket 39 in itself provides a gas-tight joint between the opposed faces of the flanges 15 and 17.

As aforestated, the particles 22 in the cartridge have gas-absorbing and/or chemical modifying properties. An effective and economical substance is small particles of charcoal which per se have gas-absorbent and gas-adsorbent properties and also, particularly when heated by exhaust gases, enhance further combustion of the exhaust gases, i.e., oxidation of the carbon monoxide to carbon dioxide, further combustion of partially burned hydrocarbons, etc. Other substances 22 may be catalytic particles comprising an inert catalytic support with an oxidation-promoting catalytic metal or metal compound on the support. Exemplary of such type catalytic substances are supported vanadium catalysts heretofore recommended for automotive exhaust systems.

The downstream, exhaust gas sound-muffling and sound-collecting chamber 13 has the same general structure as one end of the muffler of my aforesaid U.S. Pat. No. 3,522,863. It comprises a cylindrical shell 45 having a domed, downstream end 46. A tubular core 47 extends axially through the chamber 13 and is rigidly held therein by spotwelds or a contiguous bead weld 48 at the apexial, circular opening of the domed end 46. The projecting end 49 of the core is attached to an exhaust pipe of the automotive exhaust system.

The tubular core has a plurality of gas-passage openings through which a part of the exhaust gases which enter the annular space between the shell 45 and the core 47 can flow into the core 47. The most efficient arrangement and type of said openings in terms of sound-muffling and sound collection, i.e., particularly elimination of low pitch exhaust sounds, are louver openings, particularly columns of louver openings as illustrated in FIG. 1.

In the illustrated embodiment, the louvers 53 and the gas passage openings therebetween extend transversely of the longitudinal axis of the core. They preferably are arranged in diametrically opposed louver sets 50 (one of which is shown in FIG. 1) and 51, 52. The louvers in each set are arranged in columns extending longitudinally along the core in the arrangement and mode disclosed in my aforesaid patent. The annular space between the shell 45 and its domed end 46 and the tubular core 47 is packed with sound-absorbing, heat-resistant material 55, preferably an annular wrapping or annular body of heat-resistant, fibrous material, e.g., glass fibers. The exhaust unit is both sound-absorbing and sound-collecting, especially in the case of irritating, low pitch exhaust sounds, in the arrangement which provides for gas flow through the body of particles 22 and then in part into the annular, sound-absorbing and sound-collecting material 55 and in part directly into and through the tubular core 47. The best arrangement of the louvers for purposes of sound-absorption and sound-collection is that illustrated in FIG. 1, wherein the louvers 53 slope toward the axial center of the core and toward the downstream end of the unit with the openings therebetween facing in the downstream direction. This orientation of the louvers and their openings is opposite to the preferred orientation used in the muffler of my aforesaid patent.

The embodiment of FIGS. 5–7 is similar to that of FIGS. 1–4. Like reference numerals on the drawings designate like parts. The muffler and purifier 10a has two, contiguous, intermediate, axially aligned, removable cartridge-pack chambers or housings 12a and 12b, each of which is of like structure and like cartridge construction to the cartridge-pack chamber or housing 12 of FIGS. 1–4. The two chambers or housings 12a and 12b are bolted by bolts 18 to each other (with a gasket 19 therebetween) and respectively to muffling chamber 13 and expansion chamber 11.

The particles 22a and 22b in each cartridge 21 may be the same or different, solid, heat resistant, chemical compositions, e.g., small particles of charcoal which per se have gas-absorbent and gas-adsorbent properties and also, particularly when heated by exhaust gases, enhance further combustion of the exhaust gases, i.e., oxidation of the carbon monoxide to carbon dioxide, further combustion of partially burned hydrocarbons, etc. Other substances may be catalytic particles comprising an inert catalytic support with an oxidation-promoting catalytic metal or mtal compound on the suport. Exemplary of such type catalytic substances are supported vanadium catalysts heretofore recommended for automotive exhaust systems. The dual cartridges enable the inclusion of one unit for (a) absorbing and/or adsorbing exhaust gas pollutants and another unit for catalytic conversion of exhaust gas pollutants to non-noxious or less noxious gases; (b) two units for absorbing and/or adsorbing the same or different exhaust gas pollutants; and (c) two units for catalytic conversion of the same or different gases in the exhaust gas.

The embodiment of FIGS. 8 and 9 is similar in most respects to that of FIGS. 1–4. Similar parts are designated by the numerals of FIGS. 1–4, which are primed in FIGS. 8 and 9. The purifier and muffler 10' has an oval cross section for each of its upstream, gas-entrant, hollow expansion chamber 11', its intermediate, cartridge-pack chamber or housing 12' and the cartridge 21' mounted therein, and its downstream, gas discharge, sound-absorbing and sound-muffling chamber 13'. The oval cross section is similar to that used in most baffle-wall mufflers on automobiles manufactured in the last twenty years. The sound-absorbing and sound-muffling chamber 13' may be a glass-pack chamber like the chamber 13 of the embodiments of FIGS. 1–7 or it may contain sound-muffling baffle walls and/or sound-muffling perforated walls of the type used in the usual types of known automotive mufflers. In a further form of the invention, the hollow chamber 13' may be simply a mirror image of the hollow chamber 11, in which case the exhaust system for the automobile would further include a separate muffler.

The end walls 27' and 46' of the muffler and purifier unit 10' are flat, oval walls instead of the domed walls 27 and 46 as shown in the embodiments of FIGS. 1–7.

The flanges 14', 54', 16' and 17' are oval flanges having the configuration of the flange 17' illustrated in FIG. 9. These flanges may have ears 58 to provide extra metal in the flanges for accommodation of the connecting bolts 18'. The gaskets 19' are of mating oval configuration.

The respective embodiments of the invention thus provide internal combustion engine exhaust gas muffler and purifier units, each having a segmented hollow shell providing an upstream exhaust gas expansion chamber; a removable, intermediate, cartridge-pack chamber or housing (or a plurality thereof) in turn containing a replaceable cartridge; and a downstream, sound-absorbing and sound-collecting chamber which is either a hollow, empty shell or a shell containing sound-absorbing and sound-collecting means. In each instance, the embodiments provide a unit which is readily adapted to and readily installed in automotive exhaust systems. After installation, the cartridge-pack chamber or housing (or a plurality thereof) are readily removable without disconnecting the entire unit from the exhaust system for purposes of inspecting and/or replacing the particle-containing cartridge therein. Back pressure increases potentially attributable to passage of the exhaust gases through the particles of the cartridges are minimized.

It is thought that the invention and its numerous attendant advantages will be fully understood from the foregoing description, and it is obvious that numerous changes may be made in the form, construction and arrangement of the several parts without departing from the spirit or scope of the invention, or sacrificing any of its attendant advantages, the form herein disclosed being a preferred embodiment for the purpose of illustrating the invention.

The invention is hereby claimed as follows:

1. An exhaust gas purifier for connection to exhaust gas pipes in a gas exhaust system of an internal combustion engine comprising a shell adapted for axial flow therethrough of exhaust gases from an upstream end to a downstream end of said shell, said shell being axially segmented into an upstream shell segment, a downstream shell segment, and an intermediate shell part embodying at least one intermediate shell segment, said intermediate shell part being between and coaxial with said upstream and downstream shell segments, a tube projecting from the upstream end of said upstream shell segment for connection to one portion of an exhaust pipe of said gas exhaust system, an additional tube extending through said downstream shell segment and projecting from the downstream of said downstream shell segment for connection to another portion of said exhaust pipe of said gas exhaust system, annular flanges on the axial ends of said intermediate part, an annular flange on each of said upstream and downstream shell segments at the respective end of each which is in respective opposing, facing relationship with the annular flanges of said intermediate part, disconnectable fastening means for respective pairs of said flanges which are in said facing relationship to releasably hold said intermediate part and the respective upstream and downstream shell segments together as a unit, a replaceable cartridge with foraminous upstream and downstream end walls and filled with small particles of exhaust gas purifying material, said cartridge substantially filling said intermediate part of said shell, said additional tube providing a tubular core extending axially through said downstream shell segment surrounded by an annular space between said tubular core and said downstream shell segment, fiber glass sound-absorbing means in said annular space, the upstream ends of said annular space and said additional tube being in open communication with the downstream end of said cartridge in said intermediate shell part for flow of exhaust gases from said cartridge into said additional tube and also into said annular space, openings in the tubular wall of said core for flow of exhaust gases from said cartridge both directly through said core and also through said sound-absorbing means and via said openings into said core, and said cartridge being removably mounted in said intermediate shell part by a ring flange gasket mounted on one end of said cartridge and seated between opposed faces of one of said annular flanges of said intermediate part and the flange of one of said shell segments in facing relationship thereto, whereby, upon disconnection of said fastening means, said intermediate part and the cartridge therein may be removed from its position between said upstream and said downstream shell segments without disconnecting said shell segments from their respective portions of said exhaust pipe of the gas exhaust system whereupon said cartridge may be withdrawn immediately from said intermediate part for inspection or replacement of the cartridge.

2. An exhaust gas purifier as claimed in claim 15 wherein said cartridge comprises a gas permeable cylindrical screen with longitudinally extending corrugations, said corrugations providing longitudinally extending, void or substantially void, internal and external passages for flow of exhaust gases into and out of the cartridge adjacent the wall of said intermediate shell part to allow some dissipation of the heat of said exhaust gases through said wall.

* * * * *

UNITED STATES PATENT AND TRADEMARK OFFICE
CERTIFICATE OF CORRECTION

PATENT NO. : 4,032,310
DATED : June 28, 1977
INVENTOR(S) : Vincent E. Ignoffo

It is certified that error appears in the above-identified patent and that said Letters Patent are hereby corrected as shown below:

Column 4, line 68, "mtal" should read --metal--

Column 5, line 36, "54" should read --15'--

Column 6, line 17, after "downstream" insert --end--

Column 6, line 60, "15" should read --1--

Signed and Sealed this

Fourth Day of July 1978

[SEAL]

Attest:

RUTH C. MASON
Attesting Officer

DONALD W. BANNER
Commissioner of Patents and Trademarks